United States Patent [19]  
Campbell

[11] 4,102,875  
[45] Jul. 25, 1978

[54] AROMATIC SULFIDE/SULFONE POLYMER PRODUCTION

[75] Inventor: Robert W. Campbell, Bartlesville, Okla.

[73] Assignee: Phillips Petroleum Company, Bartlesville, Okla.

[21] Appl. No.: 698,576

[22] Filed: Jun. 22, 1976

[51] Int. Cl.$^2$ ............................................. C08G 75/16
[52] U.S. Cl. ..................................... 528/388; 528/364
[58] Field of Search .................. 260/79, 79.1, 79.3 M

[56] References Cited

U.S. PATENT DOCUMENTS

| 3,354,129 | 11/1967 | Edmonds, Jr. et al. | 260/79 |
| 3,780,000 | 12/1973 | Feasey et al. | 260/79.3 M |
| 4,016,145 | 4/1977 | Campbell | 260/79.3 M |

FOREIGN PATENT DOCUMENTS 1,153,035  5/1969  United Kingdom.

*Primary Examiner*—Melvyn I. Marquis

[57] ABSTRACT

Aromatic sulfide/sulfone polymers of increased molecular weight are produced by contacting a dihalo aromatic sulfone, at least partially hydrated alkali metal sulfide, and an organic amide under polymerization conditions which produce a higher molecular weight aromatic sulfide/sulfone polymer. The use of at least one at least partially hydrated alkali metal sulfide other than lithium sulfide results in polymers of increased molecular weight having utility as coatings, films, molded objects, filaments, fibers, and the like.

8 Claims, No Drawings

AROMATIC SULFIDE/SULFONE POLYMER PRODUCTION

This invention relates to the production of polymers from aromatic compounds.

In accordance with another aspect, this invention relates to a process for the production of aromatic sulfide/sulfone polymers of increased molecular weight by contacting a dihalo aromatic sulfone, a selected at least partially hydrated alkali metal sulfide, and an organic amide under polymerization conditions.

In accordance with a further aspect, this invention relates to the production of aromatic sulfide/sulfone polymers by contacting a dihalo aromatic sulfone, a selected at least partially hydrated alkali metal sulfide, and an organic amide under polymerization conditions, with the proviso that the reactants have not been treated prior to polymerization to remove free water and water of hydration.

In recent years, a wide variety of high polymers have been prepared, many of which are currently being produced and marketed on a large scale. While such polymers are useful in many areas, one property of high polymers, particularly those of the thermoplastic type, which needs to be improved is the ability to withstand high temperature. Since thermoplastic materials can be molded rapidly and efficiently into almost any desired shape, they lend themselves to mass production. The high polymer, especially a thermoplastic material, which would stand very high temperatures and could be used in such areas as electrical components, wire coatings, automotive parts, and the like has been the objective of a great deal of research.

Accordingly, an object of this invention is to produce aromatic sulfide/sulfone polymers exhibiting high molecular weight.

Another object of this invention is to provide a process for producing high molecular weight aromatic sulfide/sulfone polymers exhibiting good processability properties.

Other objects and aspects, as well as the several advantages of this invention, are apparent from a study of this disclosure and the appended claims.

In accordance with this invention, aromatic sulfide/sulfone polymers exhibiting higher molecular weight than normally obtained are produced by contacting at least one dihalo aromatic sulfone, at least one organic amide, and at least one at least partially hydrated alkali metal sulfide other than lithium sulfide under polymerization conditions for a period of time sufficient to form an aromatic sulfide/sulfone polymer.

In accordance with one specific embodiment of the present invention, at least one dihalo aromatic sulfone such as a bis(p-halophenyl) sulfone, at least one organic amide, and at least one at least partially hydrated alkali metal sulfide other than lithium sulfide containing a total of up to about 10 moles of free water and water of hydration per mole of alkali metal sulfide are contacted under polymerization conditions for a period of time sufficient to form an aromatic sulfide/sulfone polymer exhibiting higher molecular weight than normally obtained.

In accordance with this invention, in the production of an aromatic sulfide/sulfone polymer by employing a dihalo aromatic sulfone, an organic amide, and an at least partially hydrated alkali metal sulfide selected from sodium sulfide, potassium sulfide, rubidium sulfide, and cesium sulfide, it has been found that a polymer of higher molecular weight is obtained by conducting the polymerization step without a prior dehydration (or distillation) step to remove water than is obtained when water is removed prior to the polymerization step. This discovery was surprising since it previously had been observed that poly(p-phenylene sulfide) of higher molecular weight was obtained using p-dichlorobenzene, partially hydrated sodium sulfide, and N-methyl-2-pyrrolidone if the polymerization step was preceded by distillation of water from a mixture of the partially hydrated sodium sulfide and N-methyl-2-pyrrolidone than if such a distillation step was omitted.

In the present invention, at least one dihalo aromatic sulfone, at least one organic amide, and at least one alkali metal sulfide selected from the group consisting of sodium sulfide, potassium sulfide, rubidium sulfide, and cesium sulfide, the alkali metal sulfide being at least partially hydrated, are contacted under polymerization conditions for a period of time sufficient to form an aromatic sulfide/sulfone polymer.

Dihalo aromatic sulfones that can be employed in the process of this invention can be represented by the formula

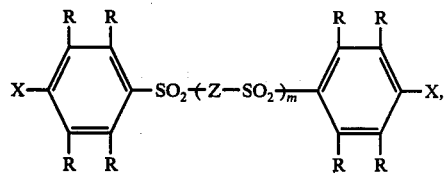

where each X is selected from the group consisting of fluorine, chlorine, bromine, and iodine; Z is a divalent radical selected from the group consisting of

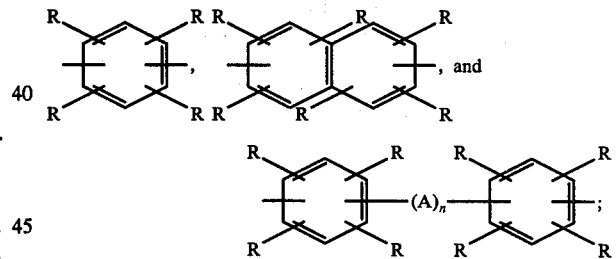

$m$ is 0 or 1; $n$ is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12. Preferably, $m$ is 0.

Examples of some dihalo aromatic sulfones that can be employed in the process of this invention include bis(p-fluorophenyl) sulfone, bis(p-chloro-phenyl) sulfone, bis(p-bromophenyl) sulfone, bis(p-iodophenyl) sulfone, p-chlorophenyl p-bromophenyl sulfone, p-iodophenyl 3-methyl-4-fluorophenyl sulfone, bis(2-methyl-4-chlorophenyl) sulfone, bis(2,5-diethyl-4-bromophenyl) sulfone, bis(3-isopropyl-4-iodophenyl) sulfone, bis(2,5-dipropyl-4-chlorophenyl) sulfone, bis(2-butyl-4-fluorophenyl) sulfone, bis(2,3,5,6-tetramethyl-4-chlorophenyl) sulfone, 2-isobutyl-4-chlorophenyl 3-butyl-4-bromophenyl sulfone, 1,4-bis(p-chlorophenylsulfonyl)benzene, 1-methyl-2,4-bis(p-fluorophenylsulfonyl)benzene, 2,6-bis(p-bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenyl] ether, bis[p-(p-chlorophenylsulfonyl)phenyl] sulfide, bis[p-(p-chlorophenylsulfonyl)phenyl] sulfone, bis[p-(p-bromophenylsulfonyl)-phenyl] methane, 5,5-bis[3-ethyl-4-(p-chlorophenylsulfonyl)phenyl] nonane, and the like, and mixtures thereof.

As indicated above, the alkali metal sulfide can be sodium sulfide, potassium sulfide, rubidium sulfide, or cesium sulfide, the alkali metal sulfide being at least partially hydrated. If desired, mixtures of alkali metal sulfides can be employed. Optionally, free water as well as water of hydration can be present. Although the sum of the amounts of water present as free water and as water of hydration can vary considerably, generally it will be within the range of about 1 mole to about 10 moles, preferably about 2 moles to about 9 moles, per mole of alkali metal sulfide. Thus, the alkali metal sulfide composition can comprise a mixture of hydrated alkali metal sulfide and either anhydrous alkali metal sulfide or free water. Examples of some suitable alkali metal sulfides include sodium sulfide nonahydrate, potassium sulfide pentahydrate, rubidium sulfide tetrahydrate, and cesium sulfide tetrahydrate. The alkali metal sulfide presently preferred is sodium sulfide containing about 60 weight percent $Na_2S$ and about 40 weight percent water of hydration, corresponding to an average of about 2.8 molecules of water of hydration per molecule of sodium sulfide.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixtures thereof.

The aromatic sulfide/sulfone polymers produced by the process of this invention can be characterized as having recurring

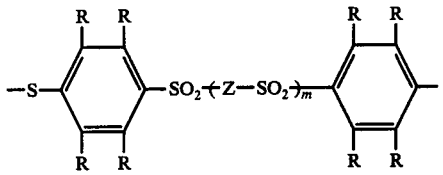

units, where each R, Z, and m as defined above.

Although the mole ratio of dihalo aromatic sulfone to alkali metal sulfide can vary over a considerable range, generally it will be within the range of about 0.9:1 to about 2:1, preferably about 0.95:1 to about 1.2:1. The amount of organic amide can vary greatly, generally being within the range of about 100 grams to about 2500 grams per gram-mole of alkali metal sulfide.

Although the reaction temperature at which the polymerization is conducted can vary over a considerable range, generally it will be within the range of about 150° C to about 240° C, preferably about 180° C to about 220° C. The reaction time can vary widely, depending in part on the reaction temperature, but generally will be within the range of about 10 minutes to about 3 days, preferably about 1 hour to about 8 hours. The pressure should be sufficient to maintain the dihalo aromatic sulfone and organic amide substantially in the liquid phase.

The aromatic sulfide/sulfone polymers produced by the process of this invention can be separated from the reaction mixture by conventional procedures, e.g., by filtration of the polymer, followed by washing with water, or by dilution of the reaction mixture with water, followed by filtration and water washing of the polymer. If desired, at least a portion of the washing with water can be conducted at an elevated temperature, e.g., from about 130° C to about 250° C.

The aromatic sulfide/sulfone polymers produced by the process of this invention can be blended with fillers, pigments, extenders, other polymers, and the like. They can be cured through crosslinking and/or chain extension, e.g., by heating at temperatures up to about 480° C in the presence of a free oxygen-containing gas, to provide cured products having high thermal stability and good chemical resistance. They are useful in the production of coatings, films, molded objects, and fibers.

EXAMPLES

In Examples I and II, values for inherent viscosity were determined at 30° C in a 3:2 mixture, by weight, of phenol and 1,1,2,2-tetrachloroethane at a polymer concentration of 0.5g/100 ml solution. In Examples III and IV, values for inherent viscosity were determined at 206° C in 1-chloronaphthalene at a polymer concentration of 0.4g/100 ml solution. In each of the Examples, values for glass transition temperature ($T_g$) and crystalline melting point ($T_m$), where shown, were determined on premelted and quenched polymer samples by differential thermal analysis. The values for polymer-melt temperature (PMT) were determined by placing portions of the polymer on a heated bar with a temperature gradient. The name poly(p-phenylene sulfide/sulfone) is used to describe an aromatic sulfide/sulfone polymer having recurring

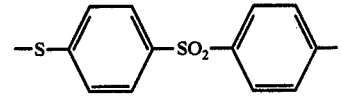

EXAMPLE I

In a control run outside the scope of this invention, employing a dehydration step, 65.2g (60 percent assay, 0.5 mole) sodium sulfide, 0.2g sodium hydroxide (to react with sodium bisulfide and sodium thiosulfate present in trace amounts in the sodium sulfide), and 158.3g N-methyl-2-pyrrolidone were charged to a stirrer-equipped, 1-liter autoclave, which was then flushed with nitrogen. Dehydration of the mixture by heating to 205° C yielded 16 ml of distillate containing 14.1g water. To the residual mixture were charged 143.6g (0.5 mole) bis(p-chlorophenyl) sulfone and 40g N-methyl-2-pyrrolidone. The resulting mixture was heated for 5 hours at 200° C at a pressure of 40–55 psig. The reaction product was washed repeatedly with hot water and dried at 80° C under nitrogen in a vacuum oven to obtain a yield of 121.9g of amorphous poly(p-phenylene sulfide/sulfone) having an inherent viscosity of 0.29, a $T_g$ of 203° C, and a PMT of 275° C.

EXAMPLE II

In a run within the scope of this invention, without the use of a dehydration step as employed in Example I, 65.2g (60 percent assay, 0.5 mole) sodium sulfide, 0.2g sodium hydroxide (to react with sodium bisulfate present in trace amounts in the sodium sulfide), 198.3g N-methyl-2-pyrrolidone, and 143.6g (0.5 mole) bis(p-chlorophenyl) sulfone were charged to a stirrer-equipped, 1-liter autoclave, which was then flushed with nitrogen. The resulting mixture was heated for 5 hours at 200° C at a pressure of 45–55 psig. The reaction product was washed repeatedly with hot water and dried at 80° C under nitrogen in a vacuum oven to obtain a yield of 109.5g of amorphous poly(p-phenylene sulfide/sulfone) having an inherent viscosity of 0.36, a $T_g$ of 209° C, and a PMT of 275° C.

Thus, based on inherent viscosity, the poly(p-phenylene sulfide/sulfone) produced in this Example was of substantially higher molecular weight than that produced in Example I, in which a dehydration step was employed prior to the polymerization step.

EXAMPLE III

In a run outside the scope of this invention, employing a dehydration step in the preparation of poly(p-phenylene sulfide) instead of poly(p-phenylene sulfide/sulfone), 127.2g (61 percent assay, 1.0 mole) sodium sulfide and 276.7g N-methyl-2-pyrrolidone were charged to a stirrer-equipped, 1-liter autoclave, which was then flushed with nitrogen. Dehydration of the mixture by heating to 215° C yielded 22 ml of distillate containing 21.2g water. To the residual mixture were charged 149.9g (1.02 moles) p-dichlorobenzene and 50g N-methyl-2-pyrrolidone. The resulting mixture was heated for 3 hours at 245° C at a pressure of 20–100 psig. The reaction product was washed with hot water and dried to obtain a yield of 100.8g of poly(p-phenylene sulfide) having an inherent viscosity of 0.16, a $T_g$ of 85° C, a $T_m$ of 288° C, and a PMT of 271° C.

EXAMPLE IV

In a run outside the scope of this invention, comparable to the run in Example III except that a dehydration step was not employed prior to the polymerization step, 127.2g of (61 percent assay, 1.0 mole) sodium sulfide, 326.7g N-methyl-2-pyrrolidone, and 149.9g (1.02 moles) p-dichlorobenzene were charged to a stirrer-equipped, 1-liter autoclave, which was then flushed with nitrogen. The resulting mixture was heated for 3 hours at 245° C at a pressure of 120–175 psig. The reaction product was washed with hot water and dried to obtain a yield of 92.2g of poly(p-phenylene sulfide) having an inherent viscosity of 0.12, a $T_g$ of 71° C, a $T_m$ of 285° C, and a PMT of 275° C.

Thus, the observation that use of a dehydration step in the preparation of poly(p-phenylene sulfide), as in Example III, resulted in a polymer of higher molecular weight than that obtained without the dehydration step, as in Example IV, rendered surprisingly the opposite effect subsequently observed in the preparation of poly(p-phenylene sulfide/sulfone), as illustrated in Examples I and II.

I claim:

1. A process for the production of aromatic sulfide/sulfone polymers of increased molecular weight which comprises contacting without a prior dehydration step to remove water a mixture consisting essentially of
    (a) at least one dihalo aromatic sulfone,
    (b) at least one at least partially hydrated alkali metal sulfide selected from the group consisting of sodium sulfide, potassium sulfide, rubidium sulfide, and cesium sulfide, and
    (c) at least one organic amide under polymerization conditions for a period of time sufficient to form a high molecular weight aromatic sulfide/sulfone polymer.

2. A process according to claim 1 wherein (a) is represented by the formula

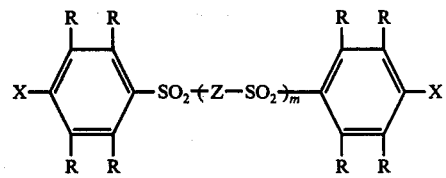

where each X is selected from the group of consisting of fluorine, chlorine, bromine, and iodine; Z is a divalent radical selected from the group consisting of

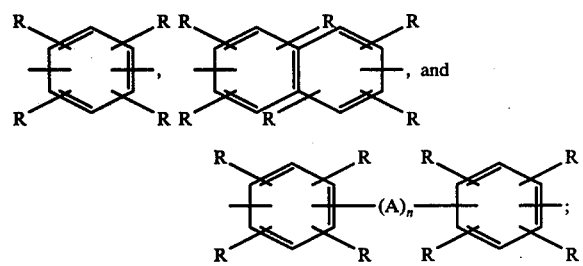

$m$ is 0 or 1; $n$ is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12, and
    (c) is a cyclic or acyclic amide having from 1 to about 10 carbon atoms per molecule.

3. A process according to claim 2 wherein $m$ is 0 and (a) is represented by the formula

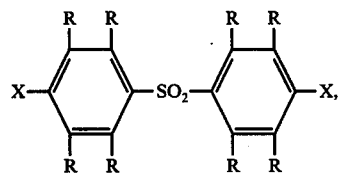

where each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups being within the range of 0 to about 12, and (c) is a cyclic or acyclic amide having from 1 to about 10 carbon atoms per molecule.

4. A process according to claim 1 wherein the temperature of the reaction is in the range of about 150° to about 240° C under sufficient pressure to maintain liquid phase conditions and further wherein the mole ratio of (a) to (b) is in the range of 0.9:1 to 2:1, the amount of (c) present is about 100 grams to about 2500 grams per gram-mole of (b), and (b) contains a total of from about 1 mole to about 10 moles of free water and water of hydration per mole of alkali metal sulfide.

5. A process according to claim 1 wherein
   (a) is bis(p-chlorophenyl) sulfone,
   (b) is partially hydrated sodium sulfide, and
   (c) is N-methyl-2pyrrolidone.

6. A process according to claim 1 wherein there is present in (b) a total of from about 1 mole to about 10 moles of free water and water of hydration per mole of alkali metal sulfide.

7. A process according to claim 1 wherein free water and water of hydration present in the reactants is not removed prior to polymerization so that polymer of higher molecular weight is obtained by conducting the polymerization without prior treatment to remove water than is obtained when water is removed prior to polymerization.

8. A process according to claim 1 wherein
   (a) is bis(p-chlorophenyl) sulfone,
   (b) is sodium sulfide containing about 60 weight percent $Na_2S$ and about 40 weight percent of water of hydration, and
   (c) is N-methyl-2-pyrrolidone.

* * * * *